Figure 4:
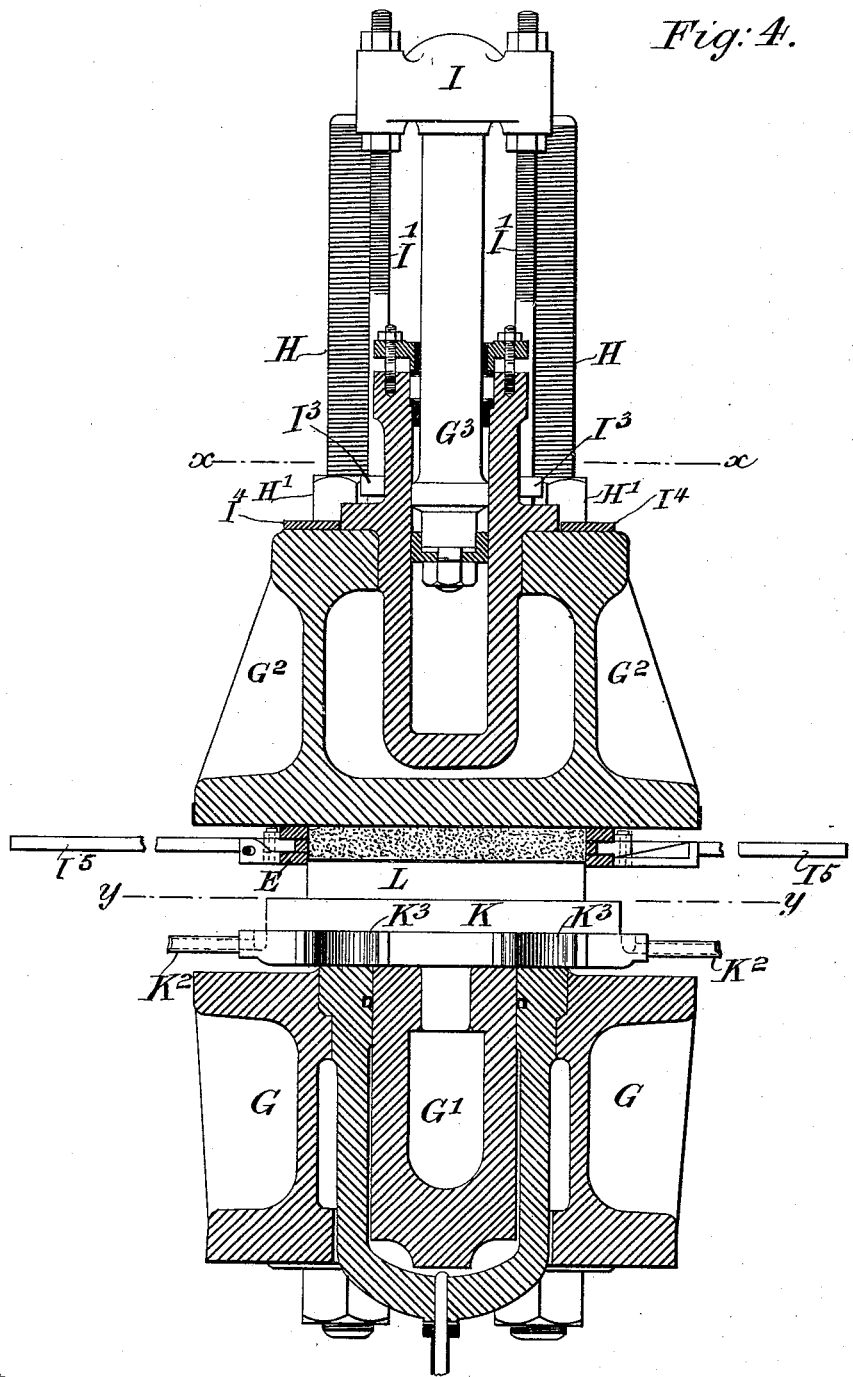

(No Model.)
A. McLEAN.
APPARATUS FOR MAKING SLABS, &c.
No. 478,757. Patented July 12, 1892.
6 Sheets—Sheet 1.
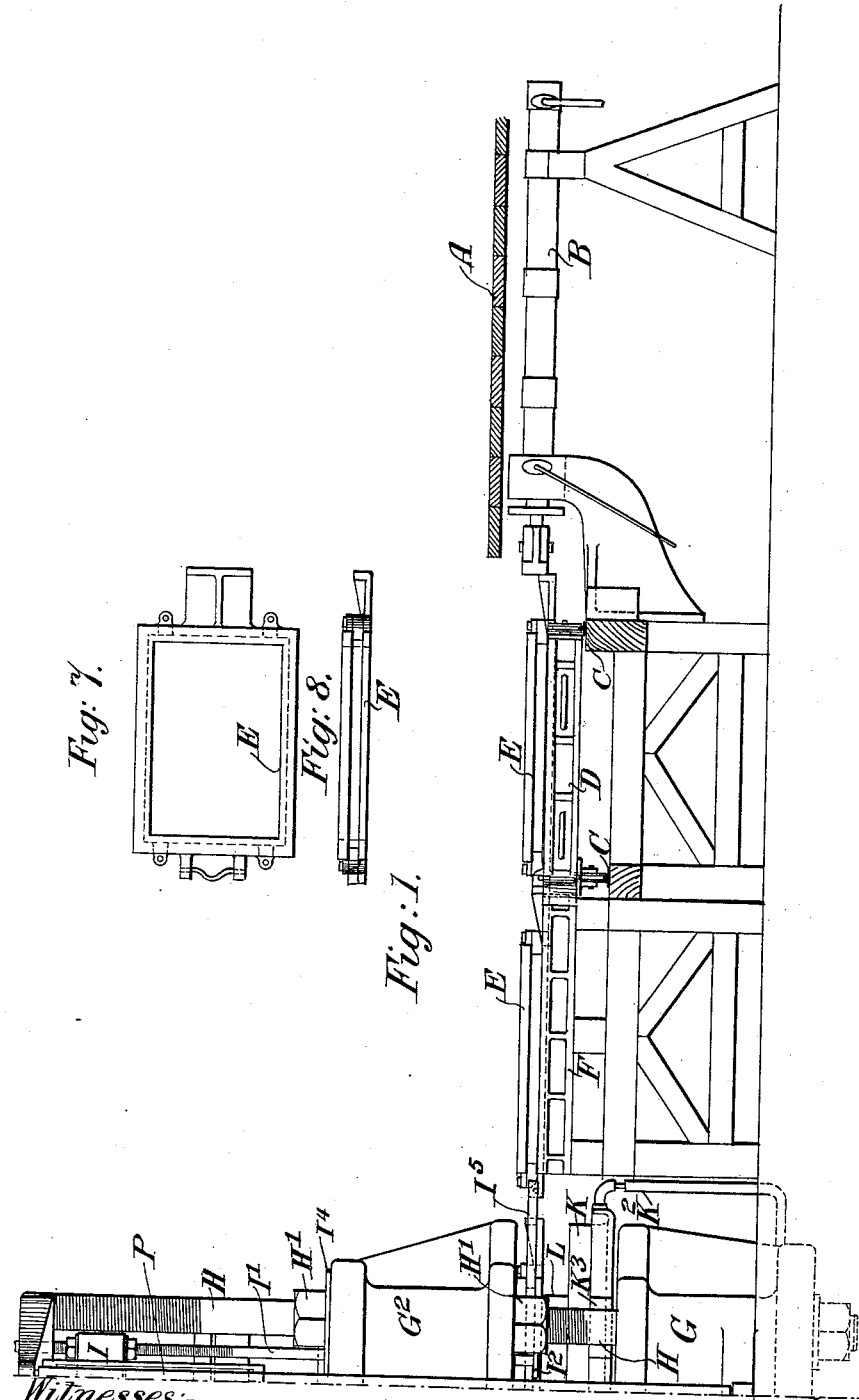

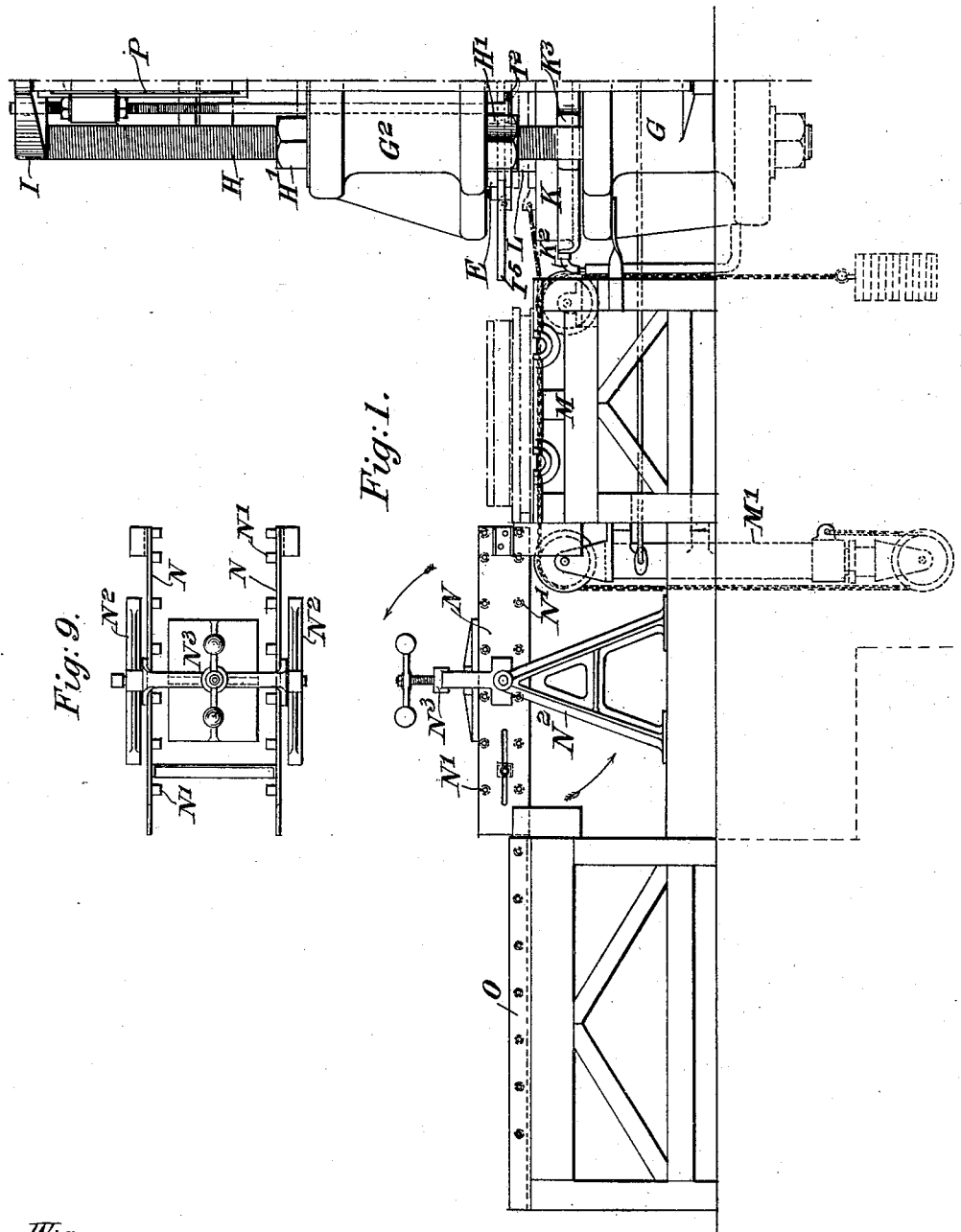

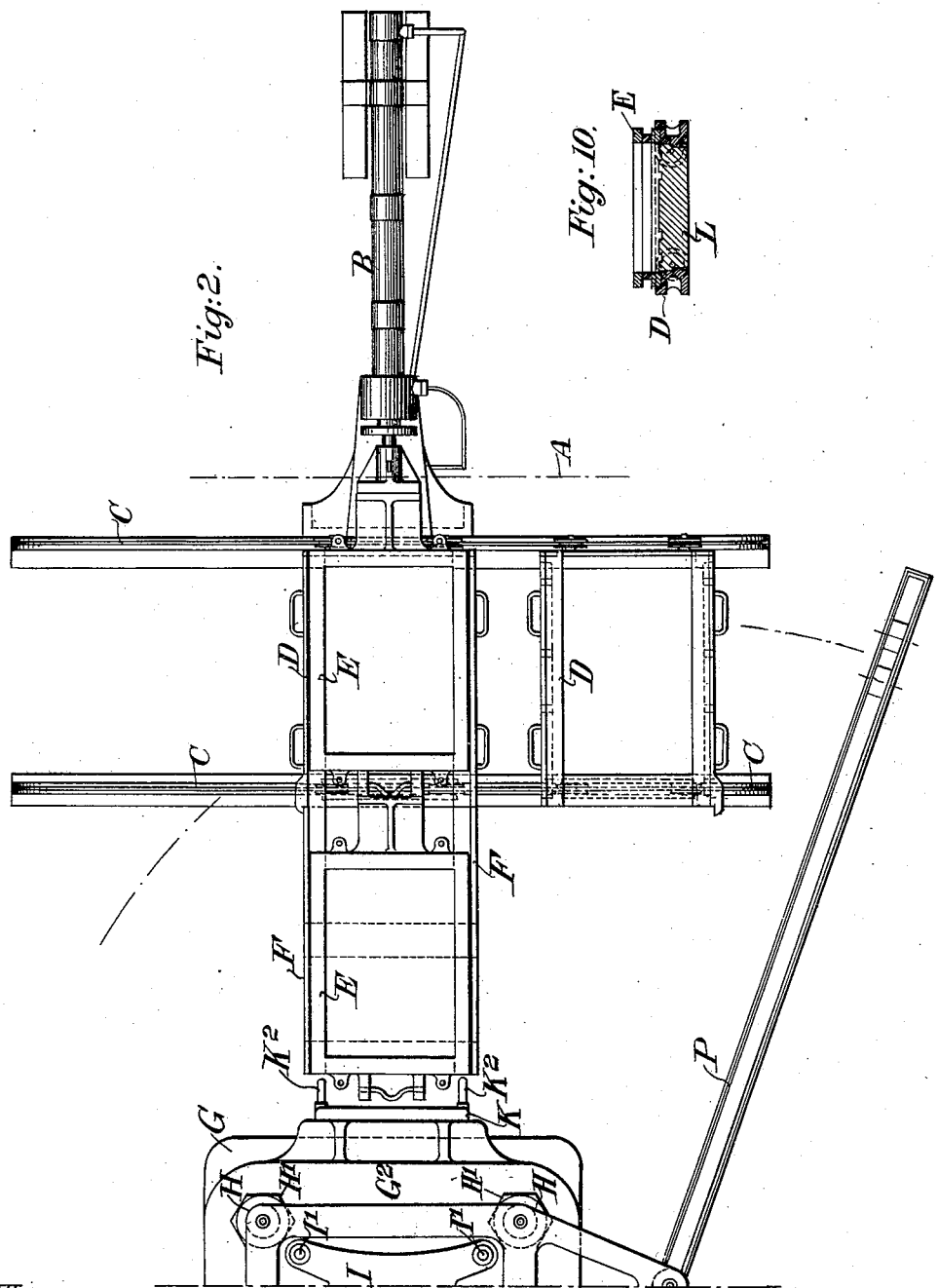

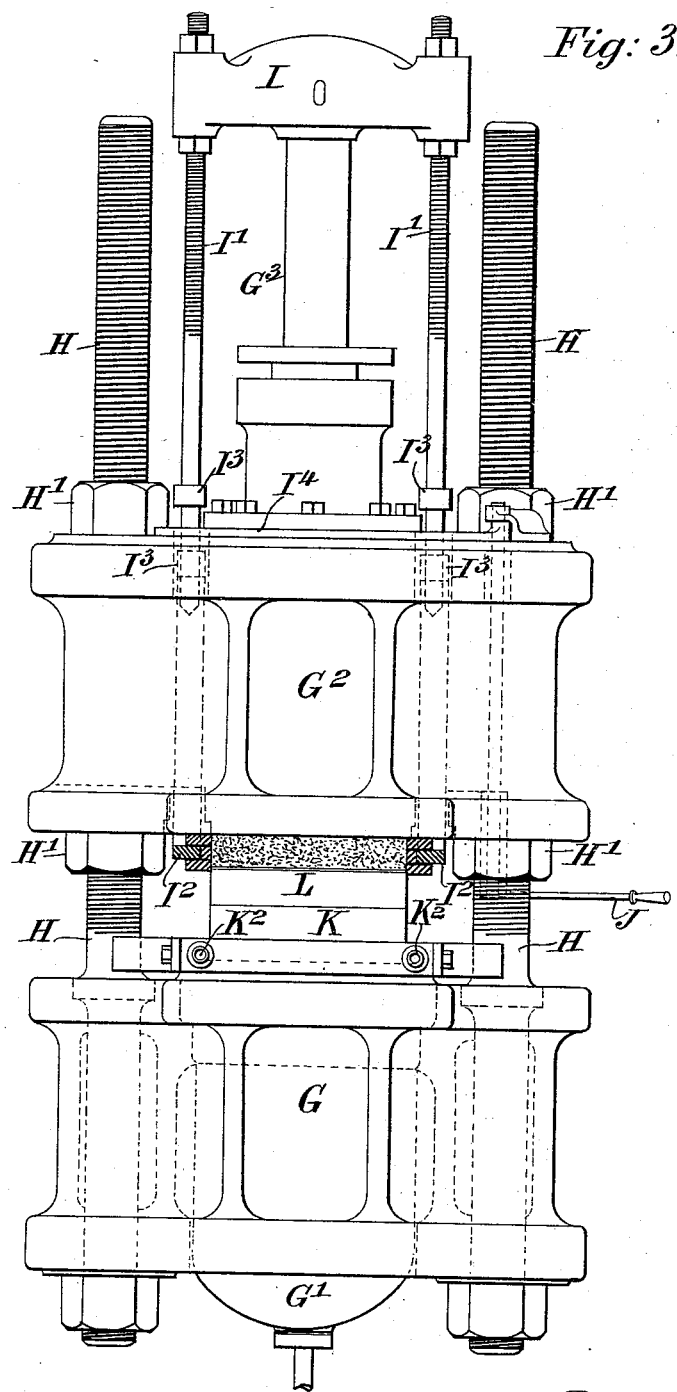

(No Model.) 6 Sheets—Sheet 5.

A. McLEAN.
APPARATUS FOR MAKING SLABS, &c.

No. 478,757. Patented July 12, 1892.

Witnesses:
George Barry,
C. J. Sundgren

Inventor:—
Alexander McLean
by attorneys
Brown & Seward (No Model.) 6 Sheets—Sheet 6.
A. McLEAN.
APPARATUS FOR MAKING SLABS, &c.
No. 478,757. Patented July 12, 1892.
*Fig: 5.*
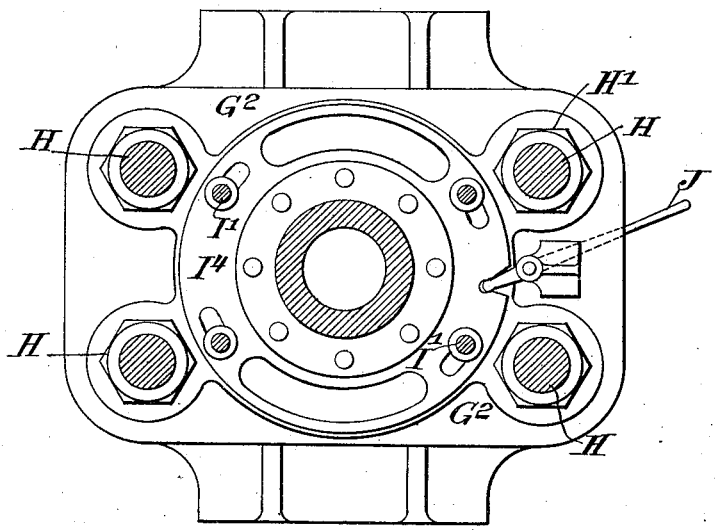
*Fig: 6.*
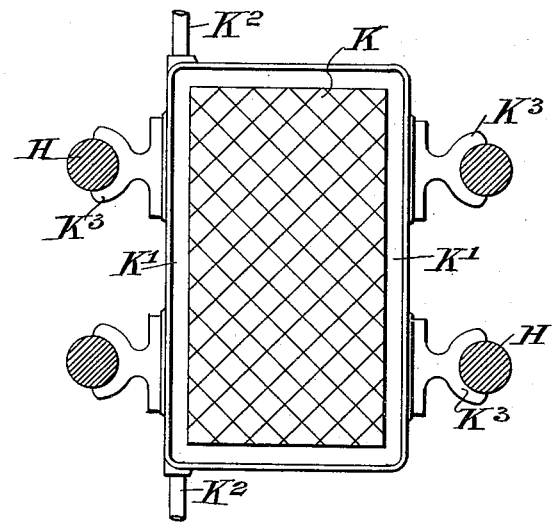
Witnesses:-
George Barry.
C. Sundgren
Inventor:
Alexander McLean
by attorneys
Brown & Seward

UNITED STATES PATENT OFFICE.

ALEXANDER McLEAN, OF WEST KENSINGTON, ASSIGNOR OF ONE-HALF TO CHRISTOPHER W. WILSON, OF LONDON, ENGLAND.

APPARATUS FOR MAKING SLABS, &c.

SPECIFICATION forming part of Letters Patent No. 478,757, dated July 12, 1892.

Application filed January 9, 1892. Serial No. 417,491. (No model.)

*To all whom it may concern:*

Be it known that I, ALEXANDER MCLEAN, of 10 Stonor Road, West Kensington, in the county of Middlesex, England, have invented certain new and useful Improvements in Apparatus for Producing Slabs or Blocks from Plastic Materials and for Separating Liquid in Excess from Solid Matters, of which the following is a specification.

The object of this invention is to provide a compact apparatus for producing slabs or blocks from plastic material for decorative or other purposes, and also for expressing an excess of liquid from solid matter—as, for instance, in sewage.

In the accompanying drawings, Figure 1, Sheets I and II, represent in side elevation, partly in section, my complete apparatus, the right-hand half being on Sheet I and the left-hand half on Sheet II. Fig. 2, Sheet III, is a plan view of the feed end or right-hand half of the apparatus. Fig. 3, Sheet IV, is a front elevation of the press, showing the mold in section. Fig. 4, Sheet V, is a sectional elevation of the press, taken at right angles to Fig. 3. Fig. 5, Sheet VI, is a plan taken on the line $x\,x$ of Fig. 4; and Fig. 6 is a plan of the main ram-head, taken on the line $y\,y$ of Fig. 4. Fig. 7, Sheet I, is a plan view, and Fig. 8 a side view of a mold. Fig. 9, Sheet II, is a plan view of a reversing apparatus, and Fig. 10, Sheet III, is a cross-section of a carriage with the mold and plunger therein.

The apparatus consists of a mixing-platform A, below which is placed a hydraulic ram B. In front of the ram and parallel with the front of the platform is a short railway C to receive carriages D, on which are placed molds E to be filled with the mixed material to be formed into slabs or blocks. Centrally of the railway, at right angles thereto and opposite the ram B, is a table F, which I term the "spreading-table," onto which the molds are pushed by the ram B in order that the material which has been thrown into them may be spread evenly by the attendant.

G is a hydraulic press, which consists of main or foundation casting G, carried on a concrete bed and containing a hydraulic ram $G'$.

Secured to the casting G are four threaded bars or guides H, on which a head $G^2$ slides vertically. The position of this head $G^2$ on the guides H is regulated by means of nuts $H'$, according to requirements. This head contains a hydraulic ram $G^3$, the plunger of which carries a cross-head I, having four pendent adjustable threaded rods $I'$, which project through the head $G^2$ and are provided at their lower ends with hooks or projections $I^2$. (See Fig. 3.) Nuts $I^3$ on the rods determine the amount of motion to be given to the cross-head under certain circumstances.

Fitted on the head $G^2$ so as to be capable of slight axial motion is a plate $I^4$, which is formed with a series of slots having enlarged circular ends, through which slots the rods $I'$ from the head pass. The enlarged circular portions are of sufficient diameter to allow the nuts $I^3$ to pass through; but by bringing the narrow portions of the slots opposite the nuts (the plate is moved axially by a handle J) the movement of the head is arrested when the nuts strike against the plate.

K is a block, which is secured to the ram $G'$ and practically forms the ram-head. This block K (see Fig. 6) is provided with a trough $K'$, all round, intended to catch the water pressed from the material in the mold while under treatment and convey it outside the press, for which purpose the trough is provided with suitable pipes $K^2$. The block is maintained in a position central of the press by the lugs $K^3$, which fit against the guides H. (See Fig. 6.)

Upon the block K is placed a block L of such dimensions that it will accurately fit into the rectangular mold E and which constitutes the plunger of the ram $G'$. The mold E is composed of a series of rectangular frames superposed, with a strip of felt between each frame, the series of frames being bolted together to form a mold of any depth. The last frame but one of the series will be smaller externally than the other frames, so as to leave a groove to receive the catches or hooks $I^2$ of the pendent rods $I'$, as seen in Figs. 1, 3, and 4.

$I^5$ are bars or rods secured to and forming lateral continuations of the hooks $I^2$. These bars or rods serve to support the mold E as it passes to and from the press.

M is a table onto which the slab of concrete or other material which has been formed is, with the mold E and block L, pulled from the press G by a chain in connection with the ram M' below the table or in other convenient manner.

N is a reversing apparatus consisting of two side plates N, set apart a distance a little more than the width of the slabs or blocks to be made and having runners N' at top and bottom. The side plates may be strengthened by cross-pieces, and they are pivoted at the center of their length to a pair of standards $N^2$. The apparatus is provided with a screw-clamping device $N^3$, by which the slabs when slid onto the runners will be securely held while the apparatus is being turned over, for a purpose to be presently explained.

O is a table, on which the slab of concrete is eventually brought prior to its being taken away to be stored.

P is a hydraulic crane suitably connected to the press G and by which the empty molds E, with the blocks L, may be moved from one end of the press to the other, as required, by means of dogs and suitable chains or otherwise.

The operation of the apparatus to produce a slab or block will be as follows: A mold E, with its block L, is placed on a carriage D and is brought in front of the ram B. On the top of the block L is placed a perforated metal plate, and this is covered by a sheet of felt and a sheet of some suitable (preferably cotton) fabric. The concrete is mixed on the platform A and sufficient to fill the mold is thrown in. The ram B is then set to work to push the filled mold onto the table F, where the concrete is evenly spread in the mold by the attendant, who places a sheet of the cotton fabric on the top of the concrete and over it, so that it will extend on all sides beyond the mold, (unless it be permanently attached to the press, which is preferable,) a sheet of felt. During this time the ram B will be withdrawn and another mold will be brought into position to be filled and forced forward by the ram. When this takes place, the first mold will be pushed into the press G, the hooks $I^2$ and the rods $I^4$ entering the groove in the sides of the mold and the position or height of the hooks and bars being regulated by the slotted plate $I^4$ and the nuts $I^3$. When the mold is in position, the plate $I^4$ is moved axially by the handle J, so that the nuts $I^3$ can pass through the enlarged portions of the slots, and the mold E is drawn up against the under side of the head $G^2$ by the action of the ram $G^3$, the water acting on the under side of a piston connected therewith, and a tight joint is made by means of the felt. The main ram is now set to work, forcing the block L into the mold E and compressing the material therein to the required extent, the liquid or moisture issuing at the bottom and top and also through the felt-lined spaces in the sides of the mold if a mold of this form is being used. The slab having been formed, the pressure is relieved and the mold E is forced down below the surface of the block L by the hooks $I^2$ and bars $I^5$ under the action of the ram $G^3$, (the water being admitted above the piston in connection therewith,) leaving the slab exposed. The plate $I^4$ and nuts $I^3$ will regulate as before, but in the contrary direction, the amount of movement given to the mold E. The mold E, with the block L and the slab, is then pulled out of the press onto the table M by means of a chain and hook connected with the ram M', or in any other convenient manner. The sheet of fabric (and the felt, if used) is now removed from the top of the slab, a board is placed thereon, and the slab on its perforated plate is pushed into the reversing apparatus N and is firmly clamped down by the clamping device. The apparatus N is then turned over, suitable stops being provided to support the ends of the frame, and the clamp is released. The slab can now be pushed out on the board onto the table O, where the perforated plate, the sheet of felt, and the fabric are removed and the slab is taken away on the board to dry and set. After the slab is placed in the apparatus N the mold E and block L are taken up by the crane P and transferred to one of the carriages D to be refilled. The carriages D are so formed that the frame E will be supported at a higher level than the block L, but not so high as to clear the block, which will be moved with and by the frame in a horizontal direction.

For treating sewage, or in other cases where there is an excess of liquid and the product is of but little use, I may retain only the press G and the built-up mold E. The mold will be built up, as above described, to any desired height, and will be permanently retained in the press. It will be lowered in the manner before described to receive the more or less liquid material to be treated, and which may be run in through a pipe from a suitably-placed reservoir, and also to remove the compressed residuum, and it will be raised to make a tight joint with the head of the press. The residuum may be pushed out of the press by hand into a chute, which will convey it to a pit or to a barge to be carried away as refuse or for subsequent treatment, as desired.

What I claim is—

A press consisting of a foundation-casting containing a hydraulic ram, an adjustable head containing a second ram, arranged to work in both directions, a cross-head connected to this ram, adjustable pendent rods carrying supporting-pieces, moulds for containing the material to be compressed, provided externally with grooves to receive the supporting-pieces, and means for insuring the exit from the mold of the liquid and for retaining the solid matter in the mold, all substantially as herein shown and described.

ALEXANDER McLEAN.

Witnesses:
H. K. WHITE,
A. S. BISHOP.